US00RE45136E

(19) United States
(12) Reissued Patent
Vardi et al.

(10) Patent Number: US RE45,136 E
(45) **Date of Reissued Patent: *Sep. 16, 2014**

(54) TELEPHONE STATUS NOTIFICATION SYSTEM

(75) Inventors: Joseph Vardi, Tel Aviv (IL); Arie Vardi, Tel Aviv (IL); Joseph Vigiser, Hod Hasharon (IL); Yair Goldfinger, Tel Aviv (IL)

(73) Assignee: Facebook, Inc., Menlo Park, CA (US)

( * ) Notice: This patent is subject to a terminal disclaimer.

(21) Appl. No.: 13/588,982

(22) Filed: Aug. 17, 2012
(Under 37 CFR 1.47)

Related U.S. Patent Documents

Reissue of:
(64) Patent No.: 7,778,396
Issued: Aug. 17, 2010
Appl. No.: 11/430,109
Filed: May 9, 2006
U.S. Applications:
(60) Continuation of application No. 10/923,789, filed on Aug. 24, 2004, now Pat. No. 7,068,770, which is a division of application No. 10/107,202, filed on Mar. 28, 2002, now Pat. No. 6,798,873, which is a continuation of application No. 09/104,970, filed on Jun. 26, 1998, now Pat. No. 6,389,127.

(30) Foreign Application Priority Data

Aug. 8, 1997 (IL) ..... 121501

(51) Int. Cl.
*H04M 11/06* (2006.01)
*H04M 1/64* (2006.01)

(52) U.S. Cl.
USPC ..... 379/88.12; 348/485; 370/260; 370/401; 375/222; 375/231; 379/15.01; 379/22.07; 379/45; 379/93.01; 379/243; 455/425

(58) Field of Classification Search
CPC ..... H04M 1/82; H04M 3/42; H04M 3/42093; H04M 3/42365; H04M 3/42374; H04M 11/04; H04M 3/30; H04L 1/0057
USPC ..... 340/905; 379/88.12, 93.23, 201.01, 379/202.01, 207.04, 209.01, 218.01, 247, 379/266.08, 243, 15.01, 22.07, 24, 27.02, 379/45, 93.01, 210.01, 242; 455/425; 348/485; 370/260, 401; 375/222, 231
See application file for complete search history.

(56) References Cited

U.S. PATENT DOCUMENTS 4,599,493 A * 7/1986 Cave ..... 379/247
4,653,090 A 3/1987 Hayden (Continued)

FOREIGN PATENT DOCUMENTS

EP 0123456 10/1984
EP 0123456 A2 1/2000

(Continued)

OTHER PUBLICATIONS http://sunsite.doc.csacsuldpublic/packages/R5contrib/xhtalk-2.9 READDME May 26, 1998.

(Continued)

*Primary Examiner* — Gerald Gauthier
(74) *Attorney, Agent, or Firm* — Keller Jolley Preece

(57) ABSTRACT

A telephone line status notification system including at least one telephone line having a status, a communications network, at least one communications terminal which is connectable to the communications network and which is employable by a seeking user to communicate via the communications network a status request concerning the status of the at least one telephone line, apparatus for processing the status request the apparatus for processing is connectable to the communications network for receiving the status request from the seeking user therethrough and communicating the request, and apparatus for acquiring the status of the at least one telephone line, the apparatus for acquiring is in communication with the apparatus for processing for receiving the status request therefrom, and the apparatus for acquiring is connectable to the communications network for communicating the status via the communications network.

89 Claims, 1 Drawing Sheet

(56) References Cited

U.S. PATENT DOCUMENTS

| | | | | |
|---|---|---|---|---|
| 4,812,843 | A * | 3/1989 | Champion et al. | 340/905 |
| 4,817,127 | A | 3/1989 | Chamberlin et al. | |
| 4,839,917 | A * | 6/1989 | Oliver | 379/45 |
| 4,937,851 | A * | 6/1990 | Lynch et al. | 379/24 |
| 4,991,203 | A * | 2/1991 | Kakizawa | 379/210.01 |
| 5,018,189 | A * | 5/1991 | Kurosawa et al. | 379/93.01 |
| 5,020,095 | A | 5/1991 | Morganstein et al. | |
| 5,136,501 | A | 8/1992 | Silverman et al. | |
| 5,214,688 | A * | 5/1993 | Szlam et al. | 379/266.08 |
| 5,245,656 | A | 9/1993 | Loeb et al. | |
| 5,276,736 | A | 1/1994 | Chaum | |
| 5,297,195 | A * | 3/1994 | Thorne et al. | 379/93.23 |
| 5,327,486 | A | 7/1994 | Wolff et al. | |
| 5,418,970 | A | 5/1995 | Gifford | |
| 5,450,468 | A * | 9/1995 | Bushnell | 379/22.07 |
| 5,471,525 | A | 11/1995 | Domoto et al. | |
| 5,475,737 | A | 12/1995 | Garner et al. | |
| 5,483,586 | A | 1/1996 | Sussman | |
| 5,506,891 | A | 4/1996 | Brown | |
| 5,533,110 | A | 7/1996 | Pinard et al. | |
| 5,535,256 | A | 7/1996 | Maloney et al. | |
| 5,535,261 | A | 7/1996 | Brown et al. | |
| 5,557,659 | A | 9/1996 | Hyde-Thomson | |
| 5,568,540 | A | 10/1996 | Greco et al. | |
| 5,583,920 | A | 12/1996 | Wheeler | |
| 5,585,858 | A | 12/1996 | Harper et al. | |
| 5,588,051 | A * | 12/1996 | Berkowitz et al. | 379/243 |
| 5,592,534 | A | 1/1997 | Ito | |
| 5,608,786 | A | 3/1997 | Gordon | |
| 5,610,910 | A | 3/1997 | Focsaneanu et al. | |
| 5,625,676 | A | 4/1997 | Greco et al. | |
| 5,635,693 | A | 6/1997 | Benson et al. | |
| 5,651,054 | A | 7/1997 | Dunn et al. | |
| 5,652,789 | A | 7/1997 | Minor et al. | |
| 5,657,376 | A | 8/1997 | Espeut et al. | |
| 5,726,948 | A | 3/1998 | Hush et al. | |
| 5,726,984 | A | 3/1998 | Kubler et al. | |
| 5,742,905 | A | 4/1998 | Pepe et al. | |
| 5,764,756 | A * | 6/1998 | Onweller | 379/242 |
| 5,774,668 | A | 6/1998 | Choquier et al. | |
| 5,790,548 | A | 8/1998 | Sistanizadeh et al. | |
| 5,799,016 | A * | 8/1998 | Onweller | 370/401 |
| 5,805,164 | A | 9/1998 | Blum et al. | |
| 5,835,566 | A * | 11/1998 | Cowgill | 379/15.01 |
| 5,862,203 | A | 1/1999 | Wulkan et al. | |
| 5,884,032 | A | 3/1999 | Bateman et al. | |
| 5,946,386 | A | 8/1999 | Rogers et al. | |
| 5,956,485 | A | 9/1999 | Perlman | |
| 5,978,672 | A | 11/1999 | Hartmaier et al. | |
| 5,995,595 | A | 11/1999 | Hickey et al. | |
| 6,031,895 | A | 2/2000 | Cohn et al. | |
| 6,078,579 | A | 6/2000 | Weingarten | |
| 6,104,711 | A | 8/2000 | Volt | |
| 6,104,909 | A * | 8/2000 | Baldwin et al. | 455/425 |
| 6,108,704 | A | 8/2000 | Hutton et al. | |
| 6,144,848 | A | 11/2000 | Walsh et al. | |
| 6,249,576 | B1 * | 6/2001 | Sassin et al. | 379/218.01 |
| 6,252,869 | B1 | 6/2001 | Silverman | |
| 6,263,049 | B1 | 7/2001 | Kuhn | |
| 6,343,115 | B1 | 1/2002 | Foladare et al. | |
| 6,389,127 | B1 * | 5/2002 | Vardi et al. | 379/209.01 |
| 6,445,733 | B1 * | 9/2002 | Zuranski et al. | 375/231 |
| 6,483,900 | B1 | 11/2002 | Light et al. | |
| 6,563,914 | B2 * | 5/2003 | Sammon et al. | 379/202.01 |
| 6,661,779 | B2 | 12/2003 | Johnson et al. | |
| 6,798,873 | B2 * | 9/2004 | Vardi et al. | 379/201.01 |
| 7,068,770 | B2 * | 6/2006 | Vardi et al. | 379/209.01 |
| 7,778,396 | B2 * | 8/2010 | Vardi et al. | 379/88.12 |
| 2002/0034289 | A1 | 3/2002 | Pershan | |
| 2002/0159577 | A1 * | 10/2002 | Vardi et al. | 379/201.01 |
| 2004/0109551 | A1 | 6/2004 | Simpson et al. | |
| 2005/0025301 | A1 * | 2/2005 | Vardi et al. | 379/207.04 |
| 2006/0233324 | A1 * | 10/2006 | Vardi et al. | 379/88.12 |

FOREIGN PATENT DOCUMENTS

| | | |
|---|---|---|
| WO | 97/14234 | 4/1997 |
| WO | 97/46955 | 12/1997 |

OTHER PUBLICATIONS

Muller, "Dial 1-800-Internet With New Software, You Can Talk Business Over the Net and Avoid Long-Distance Charges", Byte, vol. 21, No. 2, Feb. 1, 1996, pp. 83/84, 86, 88.

Wayner, "Hey Baby, Call Me at My IP Address", byte, vol. 21, No. 4, Apr. 1, 1996, pp. 142-144.

Business Week, Sep. 9, 1996, p. 120, No. 3492, Journal Code: BW, Section Heading: Personal Business: Online.

Internet Online Services: Communications, Supplier No. 19254182, Mooradian, Mark: Keane, Patrick, Interactive Content, v2,p. 7(1), Oct. 1996.

Keizer, "Comprehensive Collaboration Comes Cheap", CNET Reviews, NetMeeting 1.0 Beta 1, Jul. 16, 1996, http://www.cnet.com , pp. 1-2.

Murman et al., Perspectives on Project Athena, ACM SIGUCCS XVIII 1990, pp. 287-296.

Fermann, Distributed Consulting in a Distributed Environment, ACM SIGUCCS XVIII 1990, pp. 117-120.

French et al., The Zeohyr Programmer's Manual, Protocol Version ZEPHO.1, Apr. 5, 1989, pp. 1-82.

Zephyr on Athena (AC-34) Draft, [online], [retrieved on Jan. 27, 2003], Retrieved from the Internet: URL:http://web.mitsedu/olh/zephyr/TOC.html.

Zephyr (1) Manual Page, Jul. 1, 1998, [online], [retrieved on Jan. 27, 2003]. Retrieved from the Internet: URL:http://www.tru64unix.compaq.com/demos/ossc-v51a/man-htm/zephyr-man.html.

Zephyr Answers, [online], [retrieved on Jan. 27, 2003]. Retrieved from the Internet: URL:http://web.mit.edu/answers/zephyr.

Sharon Belville et al., Zephyr at CERN, Jul. 15, 1993, [online], [retrieved on Jan. 27, 2003]. Retrieved from the Internet: URL:http://consultscernsch/writeup/zephyr/main.html.

Cohen et al., Inessential Zephyr, [online], [retrieved on Jan. 28, 2003], Retrieved from the Internet: URL:http://www.mit.edu/afs/sipb/project/doc/izephyr/html/izephyr.html.

Finding Several Users, Jul. 14, 1994 [online], [retrieved on Jan. 27, 2003]. Retrieved from the Internet: URL:http://consultscernsch/writeup/zephyr/subsectionstar2 2 3 2.html.

C. Anthony DellaFera, et al., The Zephyr Notification Service, pp. 1-9 (circa 1988).

U.S. Appl. No. 10/107,012, filed May 6, 2003, Office Action.

Profile: AOL Technology:Turning Complicated Things Into Engaging Services, 1996 Annual Report.

U.S. Appl. No. 10/923,789, filed Feb. 6, 2006, Notice of Allowance.

U.S. Appl. No. 10/923,789, filed Oct. 20, 2005, Office Action.

U.S. Appl. No. 10/923,789, filed May 4, 2005, Office Action.

U.S. Appl. No. 11/430,109, filed Jun. 25, 2009, Office Action.

U.S. Appl. No. 11/430,109, filed Mar. 1, 2010, Office Action.

U.S. Appl. No. 11/430,109, filed May 14, 2010, Notice of Allowance.

Office Action dated May 6, 2003, which issued during the prosecution of applicant's U.S. Appl. No. 10/107.202.

* cited by examiner

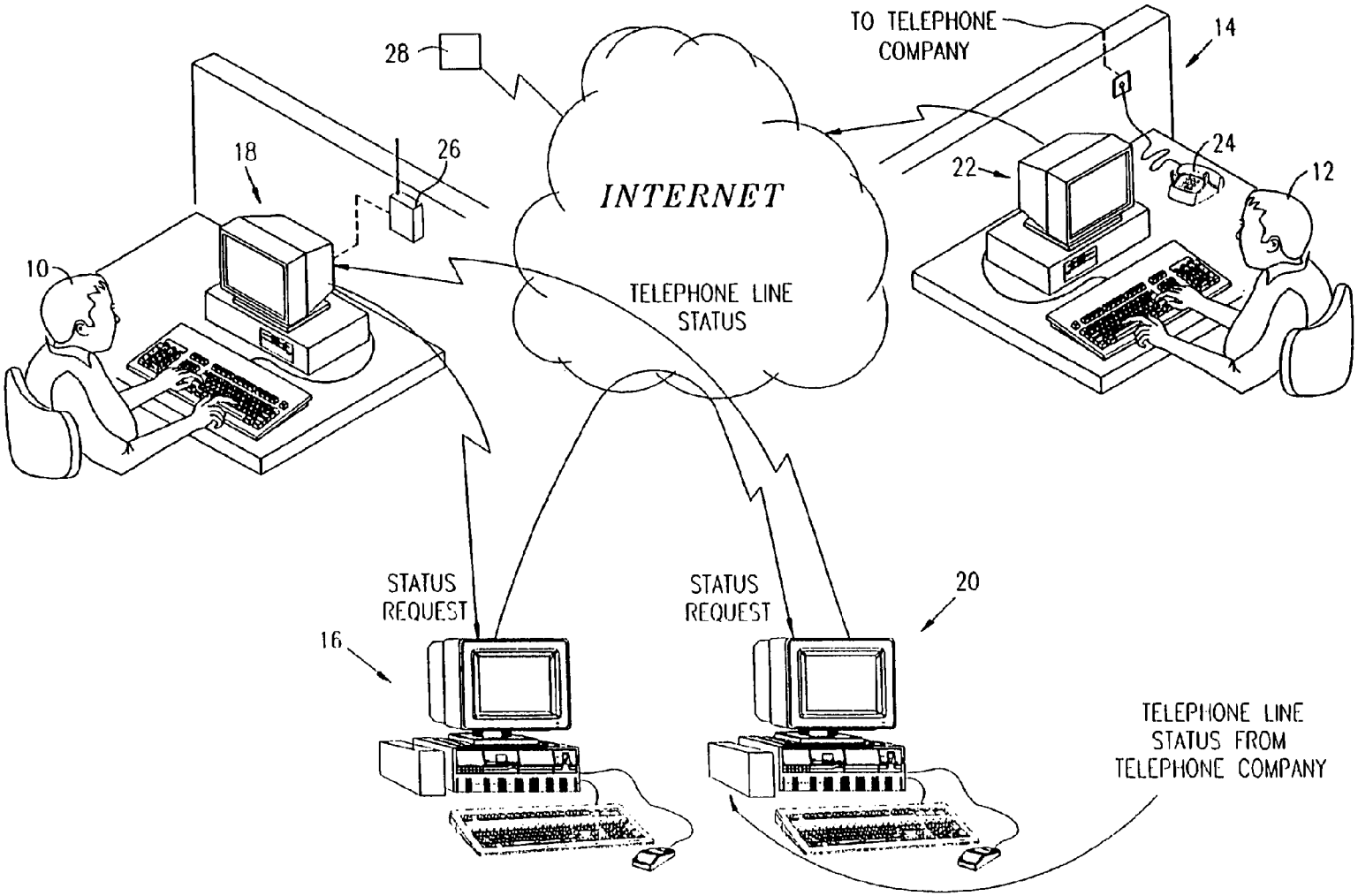
12
14
24
22
TO TELEPHONE COMPANY
INTERNET
TELEPHONE LINE STATUS
28
26
18
10
20
STATUS REQUEST
STATUS REQUEST
16
TELEPHONE LINE STATUS FROM TELEPHONE COMPANY

TELEPHONE STATUS NOTIFICATION SYSTEM

Matter enclosed in heavy brackets [ ] appears in the original patent but forms no part of this reissue specification; matter printed in italics indicates the additions made by reissue.

CROSS-REFERENCES TO RELATED APPLICATIONS

This application is a continuation application of U.S. application Ser. No. 10/923,789 filed Aug. 24, 2004 now U.S. Pat. No. 7,068,770 which is a division of U.S. application Ser. No. 10/107,202 filed Mar. 28, 2002 (now U.S. Pat. No. 6,798,873) which is a continuation of U.S. application Ser. No. 09/104,970 filed Jun. 26, 1998 (now U.S. Pat. No. 6,389,127).

FIELD OF THE INVENTION

The present invention relates to telephone status notification systems in general, and more particularly to the use of computer networks to relay the status of one or more telephones.

BACKGROUND OF THE INVENTION

It is known to provide users connected via a computer terminal to a computer network with details of the network connection status of other users similarly connected. Applicant's U.S. patent application Ser. No. 08/791,437, incorporated herein by reference, discloses a system for providing a user with the network address, network connection status, and availability status of one or more users, to enable them, for example, to initiate a point to point connection with each other.

Public telephone systems, as presently constituted, generally only provide the status of a telephone at the time one attempts to establish a connection with it. Thus, one gets a busy signal, call waiting signal, or a ringing tone, etc. Some telephone carriers provide a service whereby a person who calls another party and receives a busy signal will be alerted when the telephone number called becomes available, but again status information is provided conditionally on having dialed a number previously. The ability to get an on-line report on the status of one or more telephone numbers automatically, or of receiving the logical status set by a user regarding his availability for a telephone call, as separate from its actual physical status, independent of the need to try to call the desired number, does not exist today among telephone carriers or telephone devices connected to the public telephone system, or the telephone line at home (as opposed to the carrier), or among telephone owners today. However, in general, all the necessary information exists or can be acquired, and can be made available by telephone carriers, by a telephone device which is connected to the system, or the telephone line at home which is connected to the public system, or by the telephone owner. PABXs and other specialized telephony systems such as call centers, telephony help desks, or Automatic Call Distribution Systems do posses the possibility of getting the status of their extensions, but while this information may be available to users connected to such systems by various known methods, it is not available to seeking users of the general public who are not subscribers or extensions of such systems.

SUMMARY OF THE INVENTION

The present invention seeks to provide a system for requesting the status of a telephone line, recognizing the status, and passing on the status to one or more requesting computer network addresses. The system additionally provides for automatic call-back and conferencing once a telephone line's status has been determined.

There is thus provided in accordance with a preferred embodiment of the present invention a telephone line status notification system including at least one telephone line having a status, a communications network, at least one communications terminal which is connectable to the communications network and which is employable by a seeking user to communicate via the communications network a status request concerning the status of the at least one telephone line, apparatus for processing the status request the apparatus for processing is connectable to the communications network for receiving the status request from the seeking user therethrough and communicating the request, and apparatus for acquiring the status of the at least one telephone line, the apparatus for acquiring is in communication with the apparatus for processing for receiving the status request therefrom, and the apparatus for acquiring is connectable to the communications network for communicating the status via the communications network.

Further in accordance with a preferred embodiment of the present invention the status request includes a unique identification of any of the users.

Still further in accordance with a preferred embodiment of the present invention apparatus is included for identifying a network address associated with the unique identification.

Additionally in accordance with a preferred embodiment of the present invention at least one server is included which is connectable to the communications network.

Moreover in accordance with a preferred embodiment of the present invention either of the apparatus for acquiring and the apparatus for processing is resident in the at least one server.

Further in accordance with a preferred embodiment of the present invention the apparatus for processing is resident in the communications terminal employable by the seeking user.

Still further in accordance with a preferred embodiment of the present invention a communications terminal employable by a sought user and connectable to the communications network is included.

Additionally in accordance with a preferred embodiment of the present invention a telephone connectable to the telephone line is included.

Moreover in accordance with a preferred embodiment of the present invention the apparatus for acquiring is resident in the telephone.

Further in accordance with a preferred embodiment of the present invention the apparatus for acquiring is resident in the communications terminal employable by the sought user.

Still further in accordance with a preferred embodiment of the present invention the sought user communicates the status to the apparatus for acquiring via the communications terminal employable by the sought user.

Additionally in accordance with a preferred embodiment of the present invention the telephone line is part of a PABX system, and the status is communicated to a user not regularly connected to the PABX system.

Further in accordance with a preferred embodiment of the present invention a cellular telephone in communication with the communications terminal employable by the seeking user is included.

Still further in accordance with a preferred embodiment of the present invention a cellular telephone in communication with the communications terminal employable by the sought user is included.

Additionally in accordance with a preferred embodiment of the present invention e the communications terminal employable by the seeking user is a cellular telephone.

Moreover in accordance with a preferred embodiment of the present invention the communications terminal employable by the sought user is a cellular telephone.

Further in accordance with a preferred embodiment of the present invention the communications terminal employable by the sought user is adapted to receive a call-back request from the seeking user and initiate a call to the seeking user via the telephone line.

Still further in accordance with a preferred embodiment of the present invention the seeking user has a telephone line status, and the communications terminal employable by the sought user is further adapted to initiate the call to the seeking user once the seeking user telephone line status has been determined.

Additionally in accordance with a preferred embodiment of the present invention the sought user has a telephone line status, and the communications terminal employable by the sought user is further adapted to initiate the call to the seeking user once the sought user telephone line status has been determined.

Moreover in accordance with a preferred embodiment of the present invention the sought user has a telephone line status, the seeking user has a telephone line status, and the communications terminal employable by the sought user is further adapted to initiate the call to the seeking user once either of the sought user telephone line status and the seeking user telephone line status has been determined.

Further in accordance with a preferred embodiment of the present invention apparatus is included for conferencing connectable to the communications network and adapted to receive a conferencing request from the seeking user and initiate a conference call between the seeking user and at least one sought user.

Still further in accordance with a preferred embodiment of the present invention the apparatus for conferencing is further adapted to first initiate a call to the seeking user and telephonically receive from the seeking user either of a telephone number of the sought user and an identifier associated with a telephone number of the sought user.

Additionally in accordance with a preferred embodiment of the present invention the at least one sought user has a telephone line status, and the apparatus for conferencing is further adapted to initiate the conference call once the sought user telephone line status has been determined.

Moreover in accordance with a preferred embodiment of the present invention the seeking user has a telephone line status, and the apparatus for conferencing is further adapted to initiate the conference call once the seeking user telephone line status has been determined.

Further in accordance with a preferred embodiment of the present invention the at least one seeking user has a telephone line status, the at least one sought user has a telephone line status, and the apparatus for conferencing is further adapted to initiate the conference call once either of the seeking user telephone line status and the sought user telephone line status has been determined.

Still further in accordance with a preferred embodiment of the present invention the apparatus for acquiring maintains at least one telephone number associated with at least one sought user.

Additionally in accordance with a preferred embodiment of the present invention the either of the apparatus for acquiring and the apparatus for processing includes apparatus for checking the status request from the seeking user for an authorization.

Moreover in accordance with a preferred embodiment of the present invention the communications network is the Internet.

Further in accordance with a preferred embodiment of the present invention the cellular telephone is adapted to communicate using either of IP protocols and non-IP protocols.

There is additionally provided in accordance with a preferred embodiment of the present invention a method for providing telephone line status, the method including providing at least one telephone line having a status, providing a communications network, communicating via the communications network a status request from a seeking user, the status request concerning the status of the at least one telephone line, acquiring the status of the at least one telephone line, and communicating the status via the communications network, thereby providing the telephone line status.

Further in accordance with a preferred embodiment of the present invention the communicating via the communications network a status request step includes communicating a unique identification of any of the users.

Still further in accordance with a preferred embodiment of the present invention the method includes identifying a network address associated with the unique identification.

Additionally in accordance with a preferred embodiment of the present invention the acquiring step includes acquiring the status of the at least one telephone line from a sought user.

Moreover in accordance with a preferred embodiment of the present invention the method includes the steps of receiving a call-back request from the seeking user at a sought user, and initiating a call-back to the seeking user from the sought user via the telephone line.

Further in accordance with a preferred embodiment of the present invention the method includes the steps of receiving a conferencing request from the seeking user, and initiating a conference call between the seeking user and at least one sought user.

Still further in accordance with a preferred embodiment of the present invention the initiating step includes initiating once either of the seeking user's telephone line status and the sought user's telephone line status has been determined.

Additionally in accordance with a preferred embodiment of the present invention the acquiring step includes checking the status request from the seeking user for an authorization.

Moreover in accordance with a preferred embodiment of the present invention the communicating the status step includes communicating the status to either of the seeking user and a recipient indicated in the status request.

It is noted that throughout the specification and claims the phrase "status of a telephone," "status of a telephone number," or derivations and permutations thereof refer to whether a telephone line at a given telephone number is physically in use or not, or whether it is logically "in use" or not, that is, whether or not the end-user or owner of a telephone line wishes to be contacted there through specifically by a telephone.

It is further noted that throughout the specification and claims the term "PABX" encompasses other specialized telephony systems such as call centers, telephony help desks, or Automatic Call Distribution Systems It is further noted that throughout the specification and claims the term "user" encompasses any entity, preferably human, that operates a computer or other communications terminal, preferably for the purpose of connecting to and communicating via a communications network. It is further noted that the term "seeking user" encompasses any user who requests the status of a telephone line. It is further noted that the term "sought user" encompasses any user whose telephone line status is desired by a seeking user. It is further noted that the term "Internet" encompasses other communications systems using the Internet Protocol such as, but not limited to, "Intranet" and "Extranet" networks.

BRIEF DESCRIPTION OF THE DRAWINGS

The present invention will be understood and appreciated from the following detailed description, taken in conjunction with the drawings in which:

FIG. 1 is a simplified block diagram of a telephone status notification system constructed and operative in accordance with a preferred embodiment of the present invention.

DESCRIPTION OF THE PREFERRED EMBODIMENTS

The present invention will be understood and appreciated more fully from the following detailed description wherein reference is made, purely by way of example, to the following embodiments.

Reference is now made to FIG. 1 which is a simplified block diagram of a telephone status notification system constructed and operative in accordance with a preferred embodiment of the present invention. A user 10 wishes to determine the status of a telephone line 14 associated with a user 12. User 10 typically sends a request for telephone line status information to a request server 16. The request typically comprises the telephone number, or other information identifying telephone line 14 associated with user 12. User 10 typically sends the request via a computer terminal 18 connectable to a communications network such as the Internet, the request being sent using known Internet protocols. It is appreciated that the request may be sent by user 10 using any known messaging means, or may be sent via client software running on computer terminal 18. User 10 may provide a list of such telephone numbers that is sent to the request server once for ongoing fulfillment or submitted each time user 10 connects to the Internet. Additionally or alternatively, user 10 may send individual telephone number status requests on an ad hoc basis for one-time fulfillment Each request typically comprises information identifying one or more telephones by their number, owner's name, or by any other identification method. Request server 16 is typically connectable to the Internet and is capable of receiving the request of user 10. The request also preferably comprises a unique identification code and/or network address identifying user 10, and a unique identification code and/or network address to which the notification of the status of telephone line 14 is to be sent. The request may also comprise one or more telephone numbers associated with user 10. The request may also comprise a unique identification code and/or network address identifying user 12. Any of the network addresses described hereinabove may be user 10's or user 12's permanent IP address, should user 10 or user 12 possess one. Where user 10 or user 12 have a dynamic IP address, the network address may be identified by other identifying information, such as a permanent subscriber code with which the dynamic IP address is related in a given session. Where a unique identification code is used, apparatus may be provided to determine a network address associated therewith. An example of this is described with reference to Applicant's U.S. patent application Ser. No. 08/791,437.

Request server 16 then typically forwards the request to a telephone status acquirer 20, typically via the Internet. Telephone status acquirer 20 may be a server or other apparatus at a telephone company or other entity to which telephone line statuses may become known. It is appreciated that request server 16 and telephone status acquirer 20 may be housed within a single server. It is further appreciated that request server 16 may be embodied within client software running on computer terminal 18, being capable of sending a request directly to the telephone status acquirer 16 as described hereinabove.

It is appreciated that telephone status acquirer 20 may be embodied within client software running on a computer terminal 22 used by user 12 that is connectable to the Internet. In this case, the client software typically determines the status of telephone line 14 by being in communication with a device that determines the on-hook/off-hook status of telephone line 14. The device may be attached to the telephone line (a line detector), connected directly to a telephone 24, be part of telephone 24 itself, or contained within computer terminal 22 to which telephone 24 or telephone line 14 may be connected via any one of a number of well-known interface devices. Alternatively, the client software can be integrated with and reside in telephone 24. Alternatively, telephone line 14 may be a PABX extension. In this case, telephone status acquirer acquires the status from a known and integral part of a PABX system configured to determine the status of telephone line 14, and then delivers the status, typically via the Internet or other non-PABX connection, to requesting server 16, computer terminal 18, or whatever destination or destinations specified in user 10's request. User 12 may additionally or alternatively enter the physical status of telephone line 14 into the client software to indicate that telephone line 14 is busy, available, etc., and/or "logical" telephone statuses such as "available/not available for calls," or more detailed status information such as "available for calls, but only to the following list of users . . . " and the like.

User 12 may additionally or alternatively enter one or more telephone numbers with which user 12 is associated into the client software. Should user 10 not know with which telephone number user 12 is associated, or otherwise not wish to refer to user 12 by a telephone number, user 10 may include information in his request identifying user 12 by means other than a telephone number. In this case, the status returned typically includes a telephone number or numbers entered by user 12 into client software as described hereinabove. Alternatively, user 10 may request the statuses of telephone numbers user 12 uses regularly, typically with telephone status acquirer 20 or request server 16 storing one or more telephone numbers recently used by user 12.

Requesting server 16 or telephone status acquirer 20 may be provided with means for checking the authorization of user 10 to request the status of telephone line 14 before divulging such. For example, the status may only be divulged if user 10 possesses a certain security rating or a certain level of account, or if user 10 provides a given password.

In response to the request forwarded from request server 16, telephone status acquirer 20 preferably sends the requested status information to the destination address or addresses indicated by user 10. It is appreciated that user 10's request may specify different destinations depending on the nature of the status determination.

User 10 may alternatively input telephone line status requests into a cellular telephone 26. In this case, the cellular telephone company, or the Internet Service Provider with which cellular telephone 26 is in contact, typically forwards the request to request server 16 as described hereinabove. Client software may reside in cellular telephone 26. Cellular telephone 26 may additionally be connected to the Internet or other communications network. The client software residing in cellular telephone 26 typically generally functions as described hereinabove with reference to computer terminal 18, with telephone status information preferably being displayed on cellular telephone 26's display. It is appreciated that request server 16 may be embodied within client software running on cellular telephone 26 being capable of sending a request directly to the telephone status acquirer 16 as described hereinabove. It is further appreciated that cellular telephone 26 may be used alone or in combination with computer terminal 18, and that cellular telephone 26 may communicate using IP or other protocols.

User 12 may additionally or alternatively communicate via a cellular telephone, which may comprise any of the client software and functionality described herein with reference to computer terminal 22 and telephone 24. It is appreciated that the cellular telephone of user 12 may be used alone or in combination with computer terminal 22 and telephone 24, and that the cellular telephone of user 12 may communicate using IP or other protocols.

It is appreciated that the client software described hereinabove with reference to the cellular telephones of users 10 and 12 may reside in a computer located remotely from the cellular telephone. In this case, communication between the cellular telephones of users 10 and 12 and the client may use IP or other protocols.

It will be appreciated that a notification system as described hereinabove may be used to provide other kinds of status information, for example the statuses of monitors, sensors, or measuring apparatus and/or logical statuses input by the user. It will be further appreciated that a notification system as described hereinabove may be used in conjunction with IP telephones designed for use with the Internet, where the IP telephones comprise computer circuitry and voice processing capability. In addition, a notification and acquisition system as described hereinabove may be used in conjunction with communication devices using CATV as part of the network infrastructure.

It is appreciated that once user 10 receives telephone number and other status information associated with user 12 as described hereinabove, or once it is stored in his client software, user 10 may send a request to computer terminal 22, typically via the Internet, for a telephone call to be placed from user 12 to user 10. Client software residing in computer terminal 22 may automatically place a call to user 10 either immediately, or when the telephone line statuses of user 10 and/or user 12 become known to computer terminal 22.

User 10 may alternatively send a request, typically via the Internet, to an operator or an automatic telephone switch 28 to initiate two calls, one to user 10 and one to user 12, and conference the two calls using known conferencing means. User 10 typically can configure his client software to send the telephone numbers for himself and for user 12, or other means of identifying user 10 and user 12, in addition to billing information indicating who should be billed for the call, along with proper authorization. User 10 may request a conference call with more than one user by sending multiple telephone numbers and/or identifiers in this manner. User 10 may additionally indicate if a conference call is to be tried immediately, with calls to be conferenced-in as the specified telephone numbers become available, or tried only when all the telephone numbers requested for a conference are known to be available, such as through requesting the status of the telephone numbers as described hereinabove. User 10 may also initiate a call back, delivering his telephone number and availability to an automated switch, to be conferenced with one of the switch's outgoing dialing lines. User 10 may additionally indicate if a call back is to be tried immediately or tried only when the telephone number with which the call back is concerned is known to be available, such as through requesting the status of the telephone number as described hereinabove.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

It will be appreciated by persons skilled in the art that the present invention is not limited to what has been particularly shown and described hereinabove. Rather, the scope of the present invention is defined only by the claims that follow:

What is claimed is:

1. A method for providing telephone line status information for at least one telephone line via a computer communications network, the method comprising:

communicating, via said computer communications network, a request concerning the status of said at least one telephone line, said status comprising one or more of a physical in use status and a logical in use status;

acquiring information regarding the status of said at least one telephone line without calling said at least one telephone line; and communicating, via said computer communications network, said information regarding said status of said at least one telephone line.

2. A method according to claim 1 wherein said communicating, via said computer communications network, a request comprises communicating a unique identification associated with said at least one telephone line.

3. A method according to claim 2 and further comprising identifying a network address associated with said unique identification.

4. A method according to claim 1 and further comprising:

receiving a call-back request from at least one first communications terminal connected to said computer communication network at a second communications terminal connected to said at least one telephone line; and initiating a call-back to said at least one first communications terminal from said second communications terminal via said at least one telephone line.

5. A method according to claim 4 wherein said initiating comprises initiating once at least one of a telephone line status of said at least one first communications terminal and a telephone line status of said second communications terminal has been determined.

6. A method according to claim 1 and further comprising:

receiving a conferencing request from at least one first communications terminal connected to said computer communication network at a second communications terminal connected to said at least one telephone line; and initiating a conference call between said at least one first communications terminal and said second communications terminal.

7. A method according to claim 1 wherein said acquiring comprises checking said request for an authorization.

8. A telephone line status notification system, operative to provide telephone line status information for at least one telephone line via a computer communication network, comprising:

at least one communications terminal which is connectable to said computer communications network and which is employable to communicate via said computer communications network a request concerning status of said at least one telephone line, said status comprising one or more of a physical in use status and a logical in use status;

apparatus for processing said request wherein said apparatus for processing is connectable to said computer communications network for receiving said request and communicating said request; and apparatus for acquiring information regarding said status of said at least one telephone line without calling said at least one telephone line, wherein said apparatus for acquiring is in communication with said apparatus for processing for receiving said request therefrom, and wherein said apparatus for acquiring is connectable to said computer communications network for communicating said status via said computer communications network.

9. A telephone line status notification system according to claim 8 wherein said request comprises a unique identification associated with said at least one telephone line.

10. A telephone line status notification system according to claim 9 and further comprising apparatus for identifying a network address associated with said unique identification.

11. A telephone line status notification system according to claim 8 and further comprising at least one server which is connectable to said computer communications network.

12. A telephone line status notification system according to claim 11 wherein either of said apparatus for acquiring and said apparatus for processing is resident in said at least one server.

13. A telephone line status notification system according to claim 8 wherein said apparatus for processing is resident in said at least one communications terminal.

14. A telephone line status notification system according to claim 8 and further comprising a communications terminal connectable to said at least one telephone line.

15. A telephone line status notification system according to claim 14 wherein said apparatus for acquiring is resident in said communications terminal connectable to said at least one telephone line.

16. A telephone line status notification system according to claim 15 and wherein said status is communicated to said apparatus for acquiring via said communications terminal connectable to said at least one telephone line.

17. A telephone line status notification system according to claim 14 and further comprising a cellular telephone in communication with said communications terminal connectable to said at least one telephone line.

18. A telephone line status notification system according to claim 14 wherein said communications terminal connectable to said at least one telephone line is a cellular telephone.

19. A telephone line status notification system according to claim 14 wherein said communications terminal connectable to said at least one telephone line is adapted to receive a call-back request from said at least one communications terminal and to initiate a call to said at least one communications terminal via said at least one telephone line.

20. A telephone line status notification system according to claim 19 wherein:

said at least one communications terminal has a telephone line status; and said communications terminal connectable to said at least one telephone line is further adapted to initiate said call to said at least one communications terminal once said telephone line status of said at least one communications terminal has been determined.

21. A telephone line status notification system according to claim 19 wherein:

said communications terminal connectable to said at least one telephone line has a telephone line status; and said communications terminal connectable to said at least one telephone line is further adapted to initiate said call to said at least one communications terminal once said telephone line status of said communications terminal connectable to said at least one telephone line has been determined.

22. A telephone line status notification system according to claim 19 wherein:

said communications terminal connectable to said at least one telephone line has a telephone line status;

said at least one communications terminal has a telephone line status; and said communications terminal connectable to said at least one telephone line is further adapted to initiate said call to said at least one communications terminal once at least one of said telephone line status of said communications terminal connectable to said at least one telephone line and said telephone line status of said at least one communications terminal has been determined.

23. A telephone line status notification system according to claim 8 and further comprising a telephone connectable to said at least one telephone line.

24. A telephone line status notification system according to claim 23 wherein said apparatus for acquiring is resident in said telephone.

25. A telephone line status notification system according to claim 8 wherein said at least one telephone line is part of a PABX system, and wherein said status is communicated to a user not regularly connected to said PABX system.

26. A telephone line status notification system according to claim 8 and further comprising a cellular telephone in communication with said at least one communications terminal.

27. A telephone line status notification system according to claim 26 wherein said cellular telephone is adapted to communicate using one of IP protocols and non-IP protocols.

28. A telephone line status notification system according to claim 8 wherein said at least one communications terminal is a cellular telephone.

29. A telephone line status notification system according to claim 8 and further comprising apparatus for conferencing connectable to said computer communications network and adapted to receive a conferencing request from said at least one communications terminal and to initiate a conference call between said at least one communications terminal and a communications terminal connectable to said at least one telephone line.

30. A telephone line status notification system according to claim 29 wherein said apparatus for conferencing is further adapted to first initiate a call to said at least one communications terminal and telephonically receive from said at least one communications terminal at least one of a telephone number of said communications terminal connectable to said at least one telephone line and an identifier associated with a telephone number of said communications terminal connectable to said at least one telephone line.

31. A telephone line status notification system according to claim 30 wherein:

said communications terminal connectable to said at least one telephone line has a telephone line status; and said apparatus for conferencing is further adapted to initiate said conference call once said telephone line status of said communications terminal connectable to said at least one telephone line has been determined.

32. A telephone line status notification system according to claim 30 wherein:

said at least one communications terminal has a telephone line status; and said apparatus for conferencing is further adapted to initiate said conference call once said telephone line status of said at least one communications terminal has been determined.

33. A telephone line status notification system according to claim 30 wherein:

said at least one communications terminal has a telephone line status;

said communications terminal connectable to said at least one telephone line has a telephone line status; and said apparatus for conferencing is further adapted to initiate said conference call once at least one of said telephone line status of said at least one communications terminal and said telephone line status of said communications terminal connectable to said at least one telephone line has been determined.

34. A telephone line status notification system according to claim 8 wherein said apparatus for acquiring maintains at least one telephone number associated with said at least one telephone line.

35. A telephone line status notification system according to claim 8 and wherein at least one of said apparatus for acquiring and said apparatus for processing comprises apparatus for checking said request for an authorization.

36. A telephone line status notification system according to claim 8 wherein said computer communications network is the Internet.

*37. A method comprising:*

*communicating, by one or more servers via a computer communications network, a request concerning a status of at least one telephone line associated with a first cellular telephone device, wherein the first cellular telephone device is associated with a first user, and wherein the status comprises one or more of a physical in use status or a logical in use status;*

*acquiring, by the one or more servers, information regarding the status of the at least one telephone line associated with the first cellular telephone device without calling the first cellular telephone device; and*

*communicating, by the one or more servers via the computer communications network, the information regarding the status of the at least one telephone line associated with the first cellular telephone device to a device associated with a second user.*

*38. The method of claim 37, wherein the device associated with the second user comprises a second cellular telephone device.*

*39. The method of claim 37, wherein the device associated with the second user comprises a computer terminal.*

*40. The method of claim 37, further comprising identifying, by the one or more servers, the first cellular telephone device utilizing identifying information associated with the first cellular telephone device or the first user.*

*41. The method of claim 40, wherein the identifying information comprises at least one of a unique identification code, a telephone number, or an IP address.*

*42. The method of claim 40, wherein the identifying information comprises user-inputted information.*

*43. The method of claim 37, wherein the information regarding the status of the at least one telephone line associated with the first cellular telephone device indicates an availability of the first user to communicate with the second user.*

*44. The method of claim 37, further comprising receiving, by the one or more servers from the device associated with the second user, a request for the information regarding the status of the at least one telephone line associated with the first cellular telephone device.*

*45. The method of claim 37, wherein the one or more servers communicate with the device associated with the second user using an IP protocol.*

*46. The method according to claim 37, further comprising communicating, via the computer communications network, the request using a unique identification associated with the first cellular telephone device.*

*47. The method according to claim 46, further comprising identifying a network address associated with the unique identification.*

*48. The method according to claim 37, further comprising:*

*receiving a communication request from a first communications terminal connected to the computer communications network; and*

*initiating a communication with the first communications terminal.*

*49. The method according to claim 48, further comprising initiating the communication once at least one of a status of the first communications terminal and a status of the first cellular telephone device has been determined.*

*50. The method according to claim 37, wherein:*

*the communication request comprises a conferencing request; and*

*initiating the communication comprises initiating a conference between the first communications terminal and the first cellular telephone device.*

*51. The method according to claim 37, further comprising checking the request for an authorization.*

*52. The method of claim 37, further comprising identifying a plurality of additional users associated with the first user.*

*53. The method of claim 52, further comprising receiving identification of the plurality of additional users from the first user.*

*54. The method of claim 53, wherein receiving the identification of the plurality of additional users comprises receiving a list of information for ongoing fulfillment of status request.*

*55. The method of claim 53, wherein receiving the identification of the plurality of additional users comprises receiving individual identification information for each of the plurality of additional users.*

*56. The method of claim 53, wherein the identification of the plurality of additional users comprises a list of telephone numbers.*

*57. The method of claim 37, further comprising communicating, by the one or more servers, with software on the first cellular telephone device.*

*58. The method of claim 37, further comprising communicating the information regarding the status to the device associated with the second user by way of the Internet.*

*59. The method of claim 37, wherein acquiring the information regarding the status comprises receiving the information regarding the status from the first cellular telephone device.*

*60. The method of claim 59, wherein the first cellular telephone device automatically acquires the information regarding the status and sends the information regarding the status to the one or more servers.*

*61. The method of claim 59, wherein the information regarding the status comprises information based on user input at the first cellular telephone device.*

*62. The method of claim 61, wherein the user input indicates an availability of the user to communicate with other users.*

*63. The method of claim 62, wherein the user input indicates specific users with whom the user is available to communicate.*

*64. The method of claim 37, further comprising checking the second user's authorization prior to communicating the information regarding the status to the device associated with the second user.*

*65. The method of claim 64, wherein checking the second user's authorization comprises checking a username and password of the second user.*

*66. The method of claim 64, wherein checking the second user's authorization comprises checking security or account level of the second user.*

*67. The method of claim 37, wherein the status comprises a logical in use status.*

*68. The method of claim 67, wherein the logical in use status is set by the first user to indicate availability of the first user.*

*69. The method of claim 37, wherein the status comprises a physical in use status indicating use by the first user of the first cellular telephone device.*

*70. A system comprising:*

*one or more servers running software causing the one or more servers to:*

*communicate, via a computer communications network, a request concerning a status of at least one telephone line associated with a first cellular telephone device, wherein the first cellular telephone device is associated with a first user, and wherein the status comprises one or more of a physical in use status or a logical in use status;*

*acquire information regarding the status of the at least one telephone line associated with the first cellular telephone device without calling the first cellular telephone device; and*

*communicate the information regarding the status of the at least one telephone line associated with the first cellular telephone device to a device associated with a second user.*

*71. The system of claim 70, wherein the device associated with the second user comprises a second cellular telephone device.*

*72. The system of claim 70, wherein the device associated with the second user comprises a computer terminal.*

*73. The system of claim 70, wherein the information regarding the status of the at least one telephone line associated with the first cellular telephone device indicates an availability of the first user to communicate with the second user.*

*74. The system according to claim 70, wherein the request comprises a unique identification associated with the first cellular telephone device.*

*75. The system according to claim 74, the software further causing the one or more servers to identify a network address associated with the unique identification.*

*76. The system according to claim 75, the software further causing the one or more servers to receive the request from the device associated with the second user.*

*77. The system according to claim 70, the software further causing the one or more servers to acquire the information regarding the status from the first cellular telephone device.*

*78. The system according to claim 70, wherein the first cellular telephone device comprises an integral computing device.*

*79. The system according to claim 70, wherein the first cellular telephone device receives the communication request from the one or more servers.*

*80. The system according to claim 70, wherein the one or more servers communicate with the first cellular telephone device using one of IP protocols or non-IP protocols.*

*81. The system according to claim 70, the software further causing the one or more servers to initiate a communication between the device associated with the second user and the first cellular telephone device.*

*82. The system according to claim 70, the software further causing the one or more servers to initiate a communication with the first cellular telephone device based on the information regarding the status.*

*83. The system according to claim 70, the software further causing the one or more servers to maintain at least one unique identification code associated with the first cellular telephone device.*

*84. The system according to claim 70, the software further causing the one or more servers to check the request for an authorization.*

*85. The system according to claim 70, wherein the computer communications network comprises the Internet.*

*86. An apparatus comprising:*

*a cellular telephone device associated with a first user, the cellular telephone device configured to:*

*acquire information regarding a status of at least one telephone line associated with the cellular telephone device, wherein the status comprises one or more of a physical in use status or a logical in use status; and*

*communicate, by way of a computer communications network, the information regarding the status of the at least one telephone line associated with the cellular telephone device for delivery to a device associated with a second user,*

*wherein the information regarding the status of the at least one telephone line associated with the cellular telephone device indicates an availability of the first user to communicate with the second user.*

*87. The apparatus of claim 86, wherein the device associated with the second user comprises a second cellular telephone device.*

*88. The apparatus of claim 86, wherein the device associated with the second user comprises a computer terminal.*

*89. The apparatus of claim 86, wherein the cellular telephone device is further configured to communicate with the device associated with the second user by way of one or more servers.*

* * * * *